United States Patent [19]

Banayan

[11] Patent Number: 5,267,134
[45] Date of Patent: Nov. 30, 1993

[54] VOLTAGE AND FREQUENCY CONVERTER DEVICE

[76] Inventor: Aziz Banayan, 153 North Carson Road, Beverly Hills, Calif. 90211

[21] Appl. No.: 764,135

[22] Filed: Sep. 19, 1991

[51] Int. Cl.$^5$ .................. H02M 5/40; G05F 5/00
[52] U.S. Cl. ........................ 363/40; 363/21; 363/133; 323/266; 323/299
[58] Field of Search .................. 363/17, 20, 21, 24, 363/25, 34, 37, 131, 133, 40, 142, 143; 323/266, 299

[56] References Cited

U.S. PATENT DOCUMENTS

| | | | |
|---|---|---|---|
| 3,530,350 | 9/1970 | Gawron et al. | 363/146 |
| 4,533,986 | 8/1985 | Jones | 363/17 |
| 4,697,136 | 9/1987 | Ishikawa | 363/34 X |
| 4,996,462 | 2/1991 | Krummel | 315/DIG. 7 X |

OTHER PUBLICATIONS

"Switching scheme matches supply to mains", Design Ideas; *EDN*; Jan. 21, 1981, vol. 26, No. 2, Donald Brown, p. 153.

"Universal input adds flexibility to switching supplies", *Electronic Product Power Supplies*; Mar. 1990; pp. 29–31.

*Primary Examiner*—Emanuel T. Voeltz
*Attorney, Agent, or Firm*—Merchant, Gould, Smith, Edell, Welter & Schmidt

[57] ABSTRACT

A voltage and frequency converter device for converting a primary voltage and frequency from an electrical supply to a secondary voltage and frequency particularly useful in powering the timing mechanisms in appliances made to operate at the secondary voltage and frequency, includes a rectifier circuit for converting the alternating current oscillating at the primary frequency to direct current, circuitry for causing the current to oscillate at the second frequency and for converting the primary voltage to the secondary voltage. The output of the converter is preferably coupled only between the power source and the timing circuitry of the appliance but may also be coupled to the power circuitry for motors and the like provided the converter is further configured to generate a true sine wave output. The invention further includes a wiring configuration for a dwelling whereby the voltage and frequency converter is interconnected between the power source and the electrical wiring of the dwelling to provide the secondary voltage and frequency to at least one secondary outlet and the primary voltage and frequency to at least one primary outlet in the dwelling whereby electrical appliances which are made to operate on the secondary voltage and frequency can be utilized in the dwelling.

34 Claims, 5 Drawing Sheets

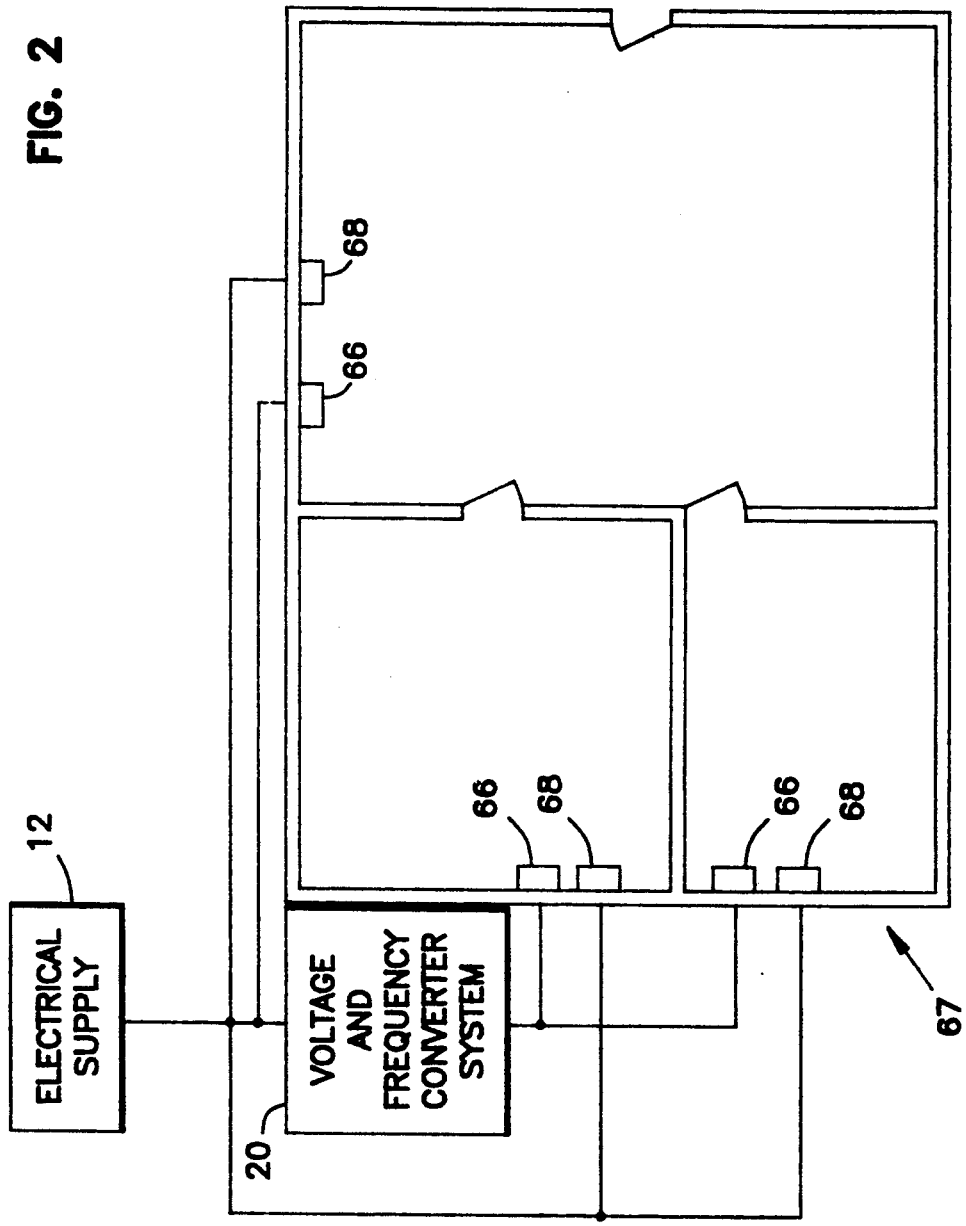

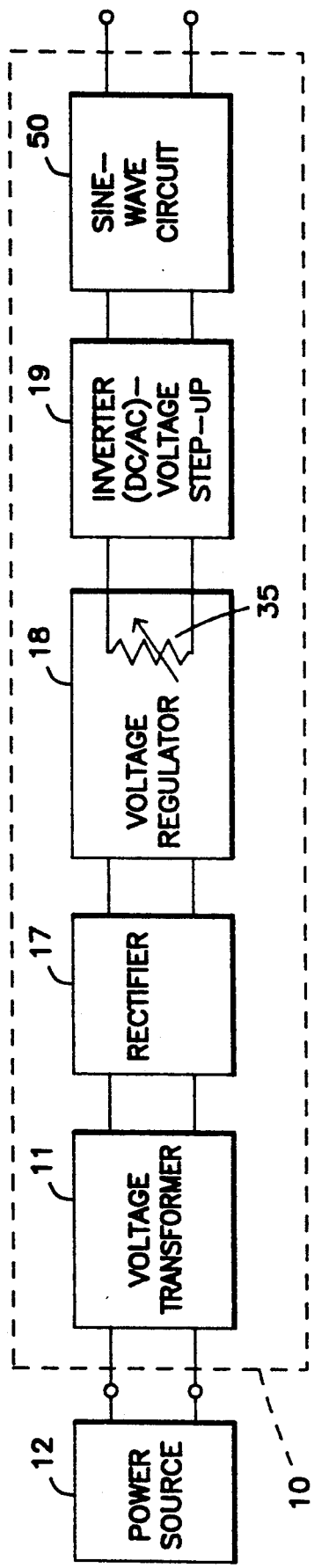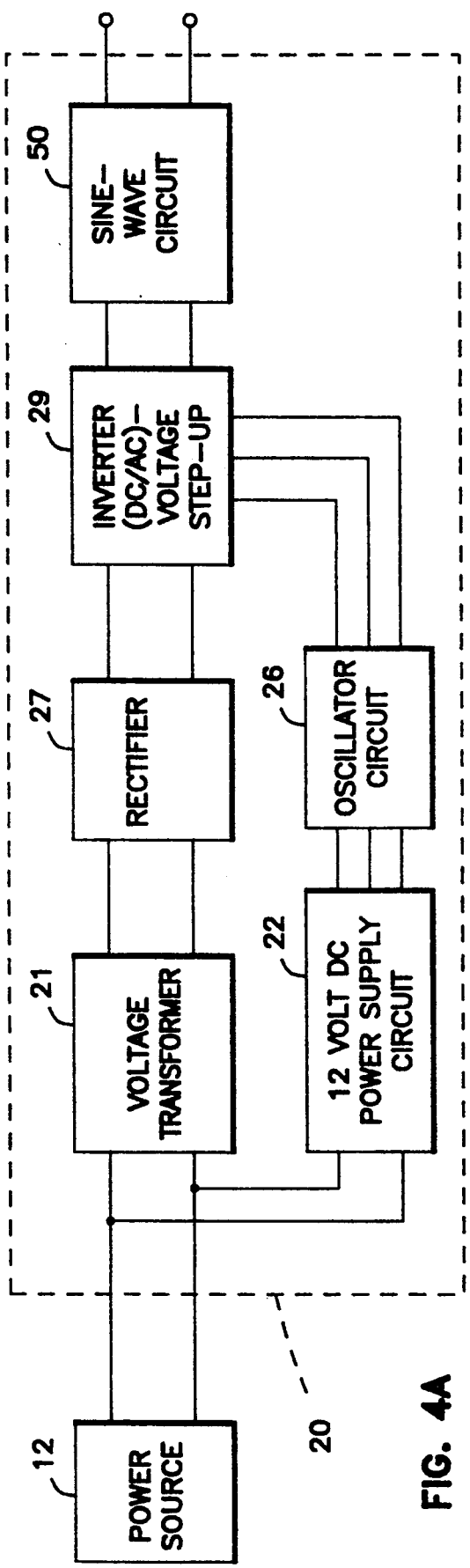

VOLTAGE AND FREQUENCY CONVERTER DEVICE

FIELD OF THE INVENTION

The present invention relates generally to the field of converting electricity. More specifically, the present invention relates to voltage and frequency converters for use in appliances or in the electrical wiring of a dwelling for converting electrical power having a primary frequency and voltage as provided by a utility, to electrical power having a secondary frequency and voltage to allow appliances designed to operate at the secondary frequency and voltage to operate without having to be redesigned.

BACKGROUND OF THE INVENTION

The functioning of many appliances such as washing machines, dryers and the like depends upon the voltage and frequency of the electrical power to which the appliance is connected. This dependency arises from the fact that the timing mechanism of the appliance is dependent on the frequency of the electrical power used to power the appliance. For example, the appliance will detect the frequency of the electrical power and use that frequency as a "clock" signal against which the sequencing and duration of various automatic operations will be set. Consequently, appliances which are made to operate on 60 Hz power will not function properly if the power is at a different frequency such as 50 Hz. Accordingly, it has heretofore been necessary to redesign the timing circuitry of the appliance if it is to be exported.

Where the only electrical conversion necessary is a voltage conversion such as on small appliances, it is common to simply install a transformer and switch in the appliance. A converter of this type is described in U.S. Pat. No. 3,833,821 to Weaver. However, such converters are only useful for such items as travel irons, hair dryers, hot hair combs, clothes steamers, coffee and tea brewers, contact lens or baby bottle sterilizers, electric razors and the like which do not have timing mechanisms which depend on the frequency of the power.

Since electrical appliances requiring clocks or timing mechanisms, such as cooking stoves with clock timers, washing machines, electrical dryers or the like, designed to operate on 110 volt, 60 Hz power will not function properly where the power is at, e.g., 50 Hz, the manufacturers of those appliances must incur substantial expense to redesign the electronics of the appliance to operate on the voltage and frequency of each country into which the appliance is to be imported. Further, since the appliances are constructed differently, the manufacturer will typically have to set up different assembly and production lines for the manufacture of those appliances depending upon whether they are for domestic or foreign use.

A need thus exists for a converter which will accept electrical power of a particular voltage or frequency, whether regulated or not, and convert that power to the voltage and frequency on which an appliance was designed to operate. The converted power would then be simply interconnected to the timing circuitry of the appliance. Such a device would eliminate the present requirement for redesigning the electronics of the appliance and would make any appliance presently designed to operate on the power available in one country operable on the power of any other country without the expense of separate assembly lines or electronic designs.

SUMMARY OF THE INVENTION

The present invention provides a voltage and frequency converter to convert a primary voltage and frequency from an electrical supply to a secondary voltage and frequency at which an appliance is designed to operate. In one embodiment, the converter includes a voltage transformer to convert the primary voltage to the secondary voltage, a rectifier circuit for converting the alternating current oscillating at the primary frequency to direct current, a voltage regulator circuit providing a regulated dc voltage, an inverter circuit for converting the regulated dc voltage to ac power at the secondary frequency and stepping up the voltage to the secondary voltage.

In a second embodiment, the invertor circuit is controlled by a crystal oscillator circuit selected to cause the output of the inverter circuit to oscillate at the desired frequency independent of the frequency of the input power.

Typically, the output of the inverter circuit is in the form of a square wave rather than a wave. While this does not affect the functioning of the timing circuitry, the motors of the appliance will not operate at all or operate inefficiently when coupled to power characterized by a square waveform. At the same time, the operation of an appliance motor is largely insensitive to frequency variations such as the difference between 50 Hz. and 60 Hz. Accordingly, in one embodiment of the invention, the motors of the appliance will be powered directly by the power from the power source (or from a transformer if the power must be stepped up or down in voltage). Alternatively, a sine wave circuit can be coupled to the output of the inverter to convert the square wave invertor output to a true sine wave. The output from the sine wave circuit can then be used both in the appliance timing circuitry and to power the appliance motors.

The invention further includes a wiring configuration for a dwelling whereby the voltage and frequency converter is interconnected between the power source and the electrical wiring of the dwelling to provide the secondary voltage and frequency to at least one secondary outlet and the primary voltage and frequency to at least one primary outlet in the dwelling whereby electrical appliances which are made to operate on the secondary voltage and frequency can be utilized in the dwelling.

These, as well as other features of the invention, will become apparent from the detailed description which follows, considered together with the appended drawings.

BRIEF DESCRIPTION OF THE DRAWINGS

The present invention is illustrated in and by the following drawings in which like reference numerals indicate like parts and in which:

FIG. 2 is a schematic representation of a wiring configuration incorporating a voltage and frequency converter to provide a dwelling with outlets for the secondary voltage and frequency from the converter as well as outlets providing the primary voltage and frequency from the electrical power source;

FIG. 3A is a simplified block diagram illustrating one embodiment of the converter circuit wherein the frequency from the converter is dependent on the voltage from a voltage regulator;

FIG. 4A is a simplified block diagram illustrating a second embodiment of the converter circuit wherein the frequency from the converter is dependent on a crystal oscillator circuit.

DETAILED DESCRIPTION OF THE PREFERRED EMBODIMENT

Figure 1A:
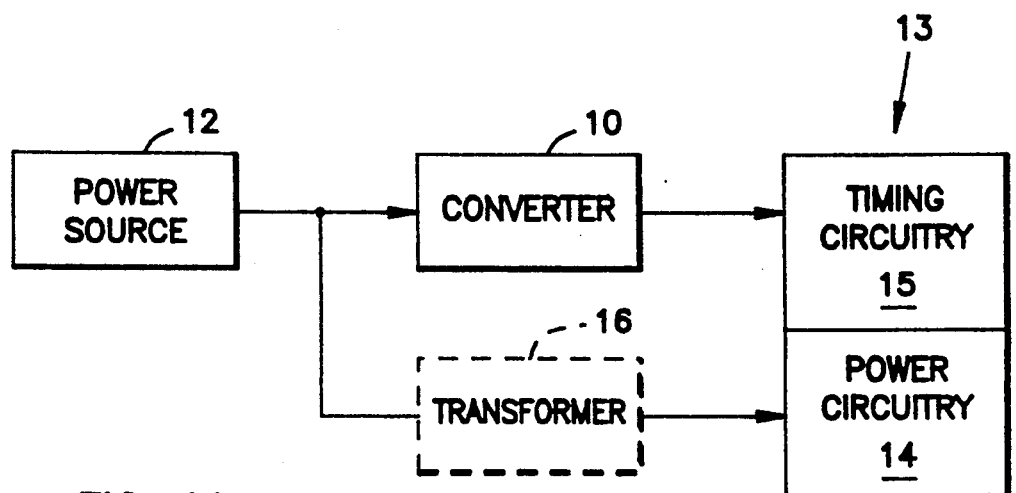
FIG. 1A is a block diagram illustrating a voltage and frequency converter in accordance with the present invention coupled between the timing circuitry of an appliance and a power source.

Referring to FIG. 1A, a voltage and frequency converter device 10 in accordance with one embodiment of the present invention is coupled between an electrical power source 12, such as that provided by a utility, and an appliance 13. The appliance 13 has power circuitry 14 which includes the motors, servos and the like which cause the appliance to operate, and timing circuitry 15 which includes timers, switches, counters and other similar components which control the sequence and timing for the functioning of the appliance motors and servos. In the embodiment illustrated in FIG. 1A, the converter is coupled just to the timing circuitry 15 of the appliance with the power circuitry powered directly from the power source. Alternatively, if the power source provides power at a different voltage than that required by the appliance 13, a suitable step-up or step-down transformer 16 may be incorporated between the power circuitry 14 and the power source 12.

Figure 1B:
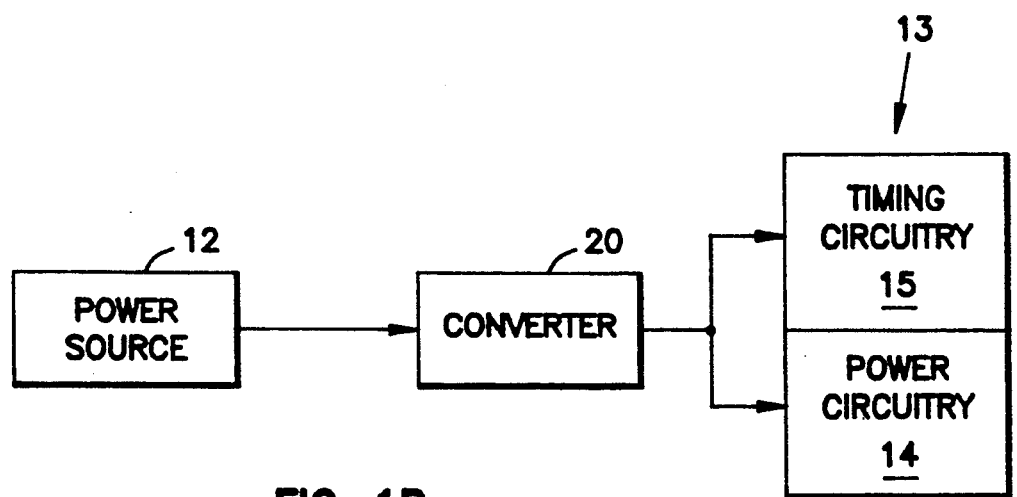
FIG. 1B is a block diagram illustrating a voltage and frequency converter in accordance with the present invention wherein the converter provides power to both the timing circuitry and the power circuitry of the appliance.

An alternative embodiment of the invention is illustrated in FIG. 1B where a converter 20 is coupled between a power source 12 and the appliance 13 with both timing circuitry 15 and power circuitry 14. The converter 20 converts both the voltage and frequency of the electrical power from the power source 12 to a voltage and frequency at which the appliance 13 was designed to operate. Preferably, the converter circuit 20 also modifies the waveform of the ac current to be a true sine wave so that the motors and servos of the power circuitry 14 will operate efficiently.

The voltage and frequency converter 10 or 20 is configured to be easily installed in the electrical appliance 13 prior to shipment to or use in a country having power with a different voltage or frequency from that for which the appliance was designed.

Referring to FIG. 2, the voltage and frequency converter 20 is illustrated interconnected to the wiring of a dwelling 67 to provide selected secondary outlets 66 with the secondary voltage and frequency and yet still provide other primary outlets 68 with the primary electrical power voltage and frequency from the electrical power source 12. Any number of primary outlets 68 or secondary outlets 66 can be provided in the wiring configuration in accordance with the invention. Accordingly, it will be appreciated that the converter in accordance with the invention can be a part of a novel wiring system of a dwelling or may be a part of an appliance itself or may even be an individual outlet which is coupled to or plugged into the dwelling wiring.

Referring to FIG. 3A, the voltage and frequency converter device 10 converts electrical power from the source 12 by first transforming the voltage in the voltage transformer 11. If the voltage does not need to be transformed because the voltage from the power source is about the same as that for which the appliance was intended to operate, then the voltage transformer can be omitted. The transformed electrical power from the transformer 11 is next converted from ac power to dc power in rectifier 17. The rectified power is then converted to a regulated dc voltage in a voltage regulator 18, with the resultant regulated voltage coupled to an inverter (dc-to-ac converter) 19 which also steps up the voltage to the desired secondary vol The frequency of resultant ac current generated by inverter 19 is determined by the regulated voltage from the voltage regulator 18. Accordingly, if the frequency of the current is to be altered, it is merely necessary to adjust a potentiometer 35 across the output terminals of the inverter.

Since the waveform of the output from the inverter will generally be a square wave, a conventional sine wave circuit 50 such as the TW24-150 available from Vanor Inc. of Columbus, Ohio, can be used where it is necessary or desirable to have a true sine wave output.

In an alternative embodiment illustrated in FIG. 4A, power from the power source 12 is first coupled, if necessary, to transformer 21 to convert the source voltage to a desired voltage. The ac power from the transformer 21 is next rectified in rectifier 27 which is coupled to an inverter circuit 29 which generates a square wave output at a frequency determined by a crystal oscillator in oscillator circuit 26. The oscillator circuit 26 is powered by a 12 volt auxiliary power supply 22 which itself is powered by the power source 12. As with the embodiment of FIG. 3A, the output from the inverter can be converted to a true sine wave utilizing a suitable, conventional sine wave circuit 50. The sine wave circuit 50 may be of the modified sine wave type which generates a stepped wave form generally approximating a sine wave or may be a circuit which generates a true sine wave.

Figure 3B:
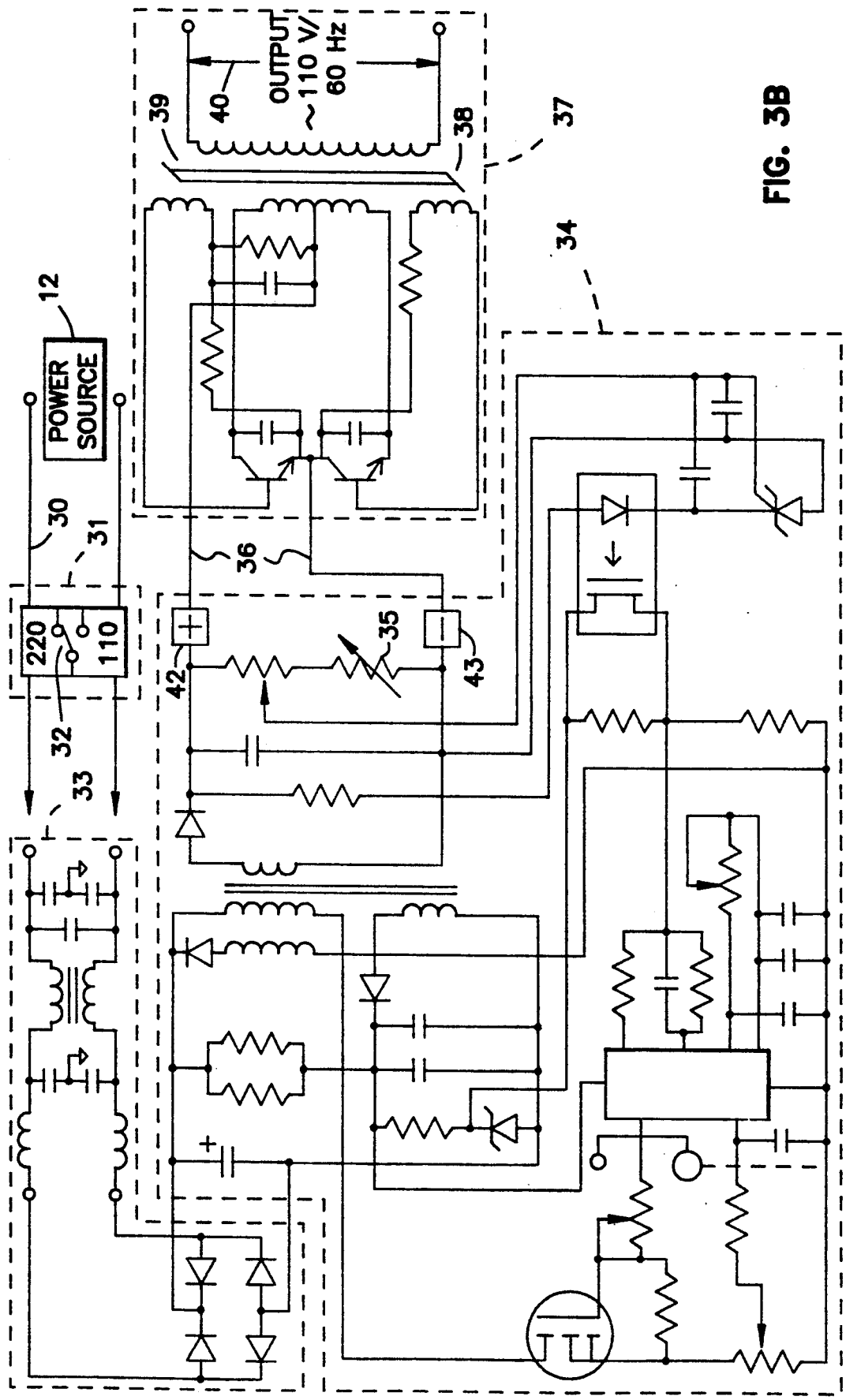
FIG. 3B is a detailed circuit diagram of the voltage and frequency converter illustrated in FIG. 3A.

Referring now to FIG. 3B, an input 30 from the electrical power source 12 is first transformed to a voltage in about the 90 to 130 volt range in transformer 31. The transformer 31 may included a switch 32 so that the converter can be used with either a 220 volt source or a 110 source as is conventionally done with small appliances. It will be appreciated that the transformer 31 can be eliminated if the power source voltage is the same as that required by the inverter circuitry. Also the switch 32 can be eliminated if the power is known to be about 220 volts.

The resultant transformed voltage from transformer 31 is coupled to a conventional rectifier circuit 33 which rectifies the incoming alternating current from the input 30. The rectifier circuit 33 is of conventional design well known to those skilled in the art and accordingly will not be further described in detail.

The rectified current is coupled to a voltage regulator circuit, 34 which generates a direct current (dc) at a predefined regulated voltage. The value of the voltage produced varies in response to the resistance value of a variable resistor 35 coupled between the positive and negative output terminals 42 & 43 respectively. The value of the voltage from the voltage regulator circuit 34 determines the frequency of the output secondary power and in the normal case will accordingly be set to a value which will insure a stable frequency of 60 Hz for the power supplied to the appliance. A rectifier circuit 33 and voltage regulator circuit 34, of conventional design are available from various sources such as Todd Electric, Elkhart, Ind., part number PC-30F rated at 30 amperes.

The output 36 from the voltage regulator 34 is coupled to an inverter circuit 37 which converts the dc current to ac current which is applied to a salivating cove transformer 38. The inverter circuit 37 is also of conventional design and may, for example be circuit No. PV-100 rated at 100 Watts from Tripp Lite Co. As above noted, the frequency of the alternating current produced by the inverter circuit 37 is dependent on the dc voltage produced by the voltage regulator 34. Thus, the of frequency of the alternating current produced by the inverter circuit 37 is controlled by varying the resistance of variable resistor 35 of the voltage regulator 34. The alternating current produced by the inverter circuit 37 is provided at an output 40 to which the timing circuit 15 of the appliance 13 is coupled.

Where the appliance is designed to operate on U.S. power, i.e., 110 volt, 60 Hz powers the resistor 35 in FIG. 3B is set to generate 60 Hz current. However, the present invention can be modified to convert 60 Hz power to 50 Hz power if an appliance designed to operate in Europe is desired to be operated in the United States.

Further, the voltage provided at the output 40 can be varied by changing the number of windings on the transformer coil 39 connected to the output 40. The values of the various components shown in FIG. 3B are not critical and can be selected by those skilled in the art to provide power at the output 40 in accordance with a specific design specification.

It will be appreciated that the waveform of the power signal from the inverter circuit 37 will generally be a square wave rather than a sine wave as is the power from the utility. While the generally square waveform does not affect the operation of the timing circuitry 15 of the appliance 13, if the output of the inverter circuit 37 is to be coupled to the appliance motors, it is preferable to further convert the output power signal from the inverter to a true sine wave since motors, servos and the like are designed to operate most efficiently when the power signal is a sine wave. This conversion may be accomplished using a conventional sine wave circuit 50 (FIG. 3A) as previously described. However, the sine wave circuit will generally not be required if the converter powers just the timing circuit of the appliance and not the power circuitry as illustrated in FIG. 1A.

Figure 4B:
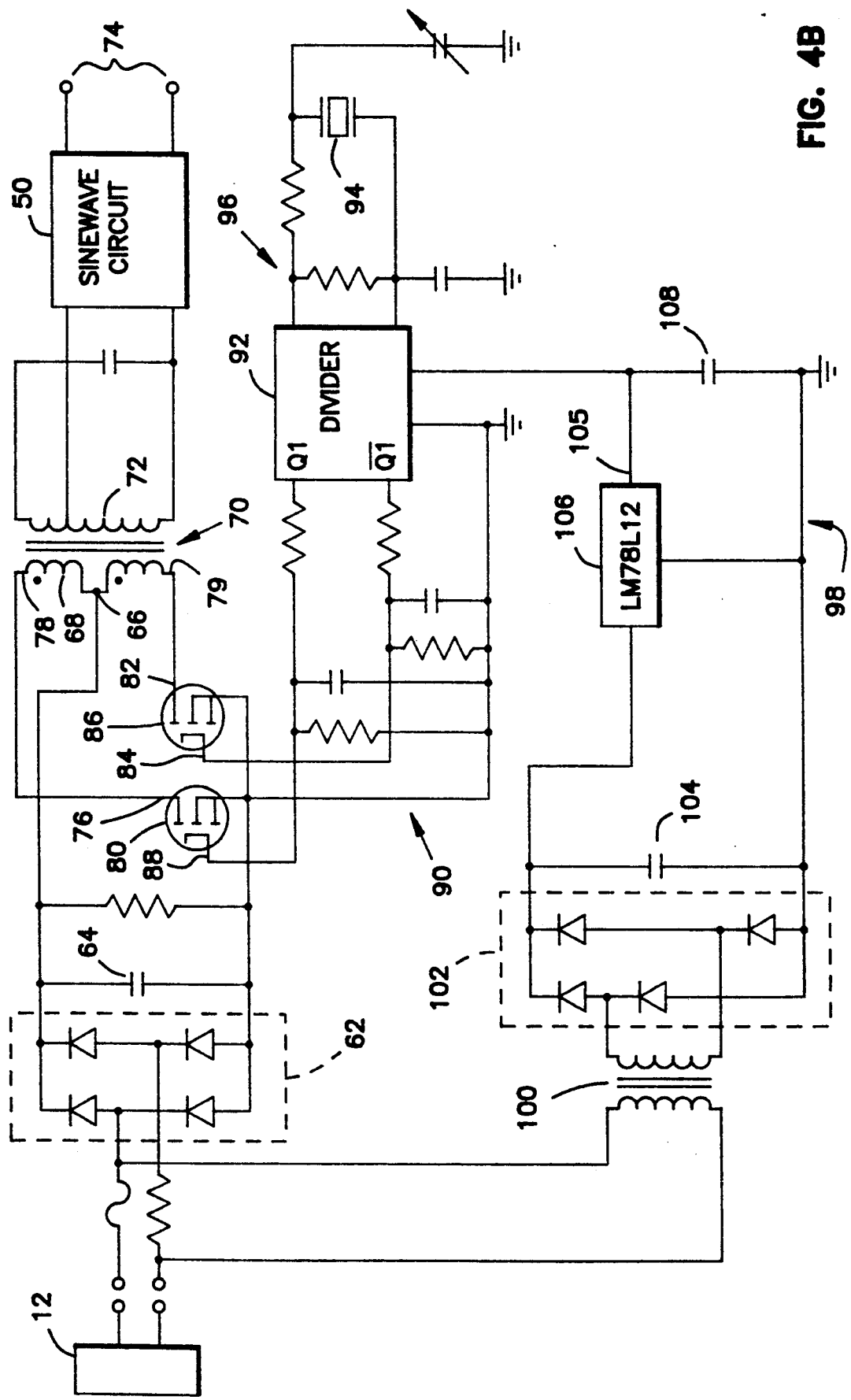
FIG. 4B is a detailed circuit diagram of the converter circuit illustrated in FIG. 4A.

Referring to FIG. 4B, another embodiment of the invention which uses a crystal oscillator to generate current at the desired frequency is illustrated. Ac power (having any frequency) from source 12 is coupled to a rectifier circuit 62 consisting of a conventional bridge circuit such as a Fagor FBU4J bridge circuit or may be constructed using individual diodes such as IN5406 diodes. The output of the bridge circuit is filtered by a capacitor 64 which may, for example, be a 2200 microfarad capacitor coupled across the output of the diode bridge circuit with one side coupled to ground. The positive output of the diode bridge is coupled to a center tap 66 of a primary winding 68 of a transformer 70 with a suitable tap off the secondary winding 72 of the transformer 70 providing the desired secondary voltage at the output 74.

To provide the desired oscillation frequency at the output 74, the drain 76 of a first field effect transistor 80 is coupled to one end 78 of the primary winding 68 and the drain 82 of a second field effect transistor 86 is coupled to the other end 79 of the primary winding 68 whereby the center tap 66 is between the two ends 78 & 79 of the primary winding 68. The field effect transistors 80 and 86 may be of any suitable type such as the IRF 723 available from International Rectifier.

The gate 88 of transistor 80 and the gate 84 of transistor 86 are coupled through a suitable biasing network 90 to the Q1 and inverted Q1 output terminals of a divider circuit 92 such as the DC4060A circuit available from RCA. The inputs to the divider circuit 92 are coupled through a second biasing network 96 across a crystal oscillator 94.

The divider circuit is powered by any suitable means such as an auxiliary power supply circuit 98. The auxiliary power supply 98 is of conventional design and may, for example include a 115 VAC, 50-400 Hz-to-14 VAC, 100 ma transformer 100 coupled between the source 12 and a diode bridge rectifier 102 such as the Fagor IN4001 bridge. The output of the bridge 102 is coupled across a 2200 microfarad filter capacitor 104 with the positive side of the capacitor coupled to the unregulated input of a voltage regulator circuit 106 such as the LM78L12 available from Texas Instruments. A capacitor 108 such as a 0.1 microfarad Mylar Capacitor is coupled between the regulated output 105 of the voltage regulator circuit 106 and ground with the regulated output providing the desired 12 volt power to the divider circuit 92.

In operation, the crystal oscillator 94 provides a signal which oscillates at high frequency. That oscillation rate is reduced in divider 92 to match the frequency desired for the output 74. The divider output and its inverse are then coupled to the transistors 80 and 84 respectively to cause the transistors to alternative turn on and off thereby generating a current path which alternately goes through each side of the primary winding 68 of the transformer 70 which in turn generates an alternating current of the desired voltage and frequency at the output 74.

As previously described, the output from the transformer 70 will have a generally square waveform. If it is desired to power motors and the like, it is therefore desirable for the reasons stated above to interpose a sine wave circuit 50 to generate a true sine wave output power signal.

Although the invention has been described in terms of a preferred embodiment, other embodiments that are apparent to those skilled in the art are also within the scope of the invention. Accordingly, the scope of the invention is intended to be defined only by reference to the appended claims.

What is claimed is:

1. A converter for converting primary ac electrical power having a primary voltage and a primary frequency for use in an electrical appliance designed to operate on secondary ac power having a secondary voltage and predefined constant secondary frequency different from but of the same order of magnitude as the primary frequency comprising:

receiving means for receiving the primary ac electrical power;

rectifying means coupled to the receiving means for rectifying the primary ac electrical power to generate dc electrical power;

oscillating means coupled to the rectifying means for converting the dc electrical power to ac electrical power oscillating at the secondary frequency;

voltage transforming means coupled for setting the voltage of the ac electrical power oscillating at the secondary frequency to the secondary voltage for generating the secondary ac power.

2. The voltage and frequency converter as defined in claim 1 wherein said receiving means is coupled to at least one primary outlet in a building for providing the electrical power having the primary voltage and frequency to said outlet and is further coupled to the converter, the output of the converter being coupled to at least one secondary outlet in the building for providing electrical power having the secondary voltage and frequency at said secondary outlet.

3. The converter of claim 1 further comprising transformer means coupled to the receiving means for transforming the primary voltage to an ac voltage, the ac voltage form the transformer means being coupled to the rectifying means.

4. The converter of claim 3 further comprising a switch means interconnected to the transformer means for enabling the transformer to receive electrical power at a first primary voltage if the switch is in a first position and enabling the transformer to receive electrical power at a second primary voltage if the switch is in a second position.

5. The converter of claim 1 wherein the oscillating means further comprises:

regulating means for receiving the dc electrical power from the rectifying means and regulating the dc voltage of the dc electrical power for generating a regulated dc voltage; and inverter means for converting the regulated dc voltage to the ac electrical power.

6. The converter of claim 1 wherein the oscillating means further comprising :

an oscillator for generating a first signal oscillating at a predefined, fixed frequency;

a divider means coupled to receive the first signal and generating therefrom an oscillation signal; and inverter means for causing the dc electrical power to oscillate at the secondary frequency in response to the oscillation signal.

7. The converter of claim 1 further comprising sine wave means coupled to the voltage transformer means for modifying the waveform of the secondary ac power to be a sine waveform.

8. The converter of claim 5 further comprising sine wave means coupled to the voltage transformer means for modifying the waveform of the secondary ac power-to be a sine waveform.

9. The converter of claim 6 further comprising sine wave means coupled to the voltage transformer means for modifying the waveform of the secondary ac power to be a sine waveform.

10. The converter of claim 1 wherein the appliance has a timing circuit and a power circuit, the converter being coupled only between the appliance timing circuit and the primary ac power.

11. The converter of claim 1 wherein the receiving means comprises a transformer for converting the voltage of the primary ac power to a secondary voltage at which a selected appliance is designed to operate.

12. The converter of claim 11 wherein the appliance has a timing circuit and a power circuit, the converter being coupled between the appliance timing circuit and the secondary voltage from the transformer and the appliance power circuit being coupled directly to the secondary voltage of the transformer.

13. A voltage and frequency converter for use with electrical appliance designed to operate at a secondary voltage and predefined constant secondary frequency comprising:

receiving means for receiving electrical power having a primary voltage and oscillating at a primary frequency;

rectifying means coupled to the receiving means for rectifying the electrical power to generate a direct current at a dc voltage;

regulating means for receiving the direct current from the rectifying means and regulating the dc voltage of the direct current for generating a regulated dc voltage; and inverter means for converting the regulated dc voltage to an alternating current at the secondary voltage and secondary frequency whereby the appliance will be operable when coupled to the primary voltage oscillating at the primary frequency through the converter.

14. The voltage and frequency converter as defined in claim 13, wherein said receiving means is coupled to at least one primary outlet in a building for providing the electrical power having the primary voltage and frequency to said outlet and is further coupled to the converter, the output of the converter being coupled to at least one secondary outlet in the building for providing electrical power having the secondary voltage and frequency at said secondary outlet.

15. The voltage and frequency converter as defined in claim 13, wherein the primary voltage is about 110 volts and the primary frequency is about 50 Hz.

16. The voltage and frequency converter as defined in claim 13, wherein the primary voltage is about 220 volts and the primary frequency is about 50 Hz.

17. The voltage and frequency converter as defined in claim 13, wherein the regulating means further comprises:

a variable resistor for varying the value of the regulated voltage in response to varying the resistance value of the variable resistor.

18. The voltage and frequency converter as defined in claim 13 wherein the secondary voltage is 110 volts and the secondary frequency is 60 Hz.

19. The voltage and frequency converter as defined in claim 13, wherein the secondary voltage is 220 volts and the secondary frequency is 50 Hz.

20. The voltage and frequency converter as defined in claim 17, wherein the secondary frequency is adjustable in response to adjustment of the resistance of the variable resistor.

21. The converter of claim 13 further comprising transformer means coupled to the receiving means for transforming the primary voltage to an ac voltage about the same as the secondary voltage, the ac voltage from the transformer means being coupled to the rectifying means.

22. The converter of claim 21 further comprising a switch means interconnected to the transformer means for enabling the transformer to receive electrical power at a first primary voltage if the switch is in a first position and enabling the transformer to receive electrical power at a second primary voltage if the switch is in a second position.

23. A system for providing dual voltages and frequencies in a building to facilitate use of electrical appliances designed to operate on only one or the other of the dual voltages and frequencies, comprising:
- at least one primary outlet;
- at least one secondary outlet;
- means for receiving primary electrical power at a primary voltage and frequency from an electrical source and interconnecting the primary electrical power to each primary outlet in the building;
- a voltage and frequency converter device coupled to the means for receiving the primary electrical power for converting the primary electrical power to secondary electrical power having a secondary voltage and frequency, the secondary electrical power coupled to each secondary outlet in the building.

24. An appliance for being coupled to a primary ac power source providing power to the appliance at a primary voltage and primary frequency, the appliance operable in response to ac electrical power at a secondary voltage and a constant secondary frequency different from the primary voltage and primary frequency, the appliance comprising:
- a power circuit coupled for being operable in response to the secondary voltage for enabling the appliance to perform at least one function;
- a timer circuit operable in response to the constant secondary frequency and coupled to the power circuit for enabling the power circuit to perform the at least one function according to a predefined sequence, the sequence timing being defined by the constant secondary frequency; and
- a converter coupled between the primary ac power source and at least one of the power circuit and timer circuit for converting the primary voltage and the primary frequency to the secondary voltage and secondary frequency comprising:
  - receiving means for receiving the primary ac electrical power;
  - rectifying means coupled to the receiving means for rectifying the primary ac electrical power to generate dc electrical power;
  - oscillating means coupled to the rectifying means for converting the dc electrical power to ac electrical power oscillating at the secondary frequency;
  - voltage transforming means coupled for setting the voltage of the ac electrical power oscillating at the secondary frequency to the secondary voltage for generating the secondary ac power.

25. The appliance of claim 24 wherein the converter further comprises transformer means coupled to the receiving means for transforming the primary voltage to an ac voltage, the ac voltage from the transformer means being coupled to the rectifier.

26. The appliance of claim 25 wherein the converter further comprises a switch interconnected to the transformer means for enabling the transformer to receive electrical power at a first primary voltage if the switch is in a first position and enabling the transformer to receive electrical power at a second primary voltage if the switch is in a second position.

27. The appliance of claim 24 wherein the oscillator further comprises:
- a regulator for receiving the dc electrical power from the rectifier means and regulating the dc voltage of the dc electrical power for generating a regulated dc voltage; and
- an inverter for converting the regulated dc voltage to the ac electrical power.

28. The appliance of claim 24 wherein the oscillating means further comprises:
- an oscillator for generating a first signal oscillating at a predefined, fixed frequency;
- a divider coupled to receive the first signal and generate therefrom an oscillation signal; and
- an inverter for causing the dc electrical power to oscillate at the secondary frequency in response to the oscillation signal.

29. The appliance of claim 24 further comprising a sine wave circuit coupled to the voltage transformer means for modifying the waveform of the secondary ac power to be a sine waveform.

30. The appliance of claim 24 wherein the converter is coupled only between the timing circuit and the primary ac power.

31. The appliance as defined in claim 24, wherein the primary voltage is about 110 volts and the primary frequency is about 50 Hz.

32. The appliance as defined in claim 24, wherein the primary voltage is about 220 volts and the primary frequency is about 50 Hz.

33. The appliance as defined in claim 24, wherein the secondary voltage is 110 volts and the secondary frequency is 60 Hz.

34. The appliance as defined in claim 24, wherein the secondary voltage is 220 volts and the secondary frequency is 60 Hz.

* * * * *